(12) United States Patent
Alford et al.

(10) Patent No.: US 9,157,487 B2
(45) Date of Patent: Oct. 13, 2015

(54) DUAL DIRECTION CLUTCH BRAKE

(71) Applicant: Muncie Power Products, Inc., Muncie, IN (US)

(72) Inventors: Fred Alford, Owasso, OK (US); Brian Young, Tulsa, OK (US)

(73) Assignee: Muncie Power Products, Inc., Muncie, IN (US)

( * ) Notice: Subject to any disclaimer, the term of this patent is extended or adjusted under 35 U.S.C. 154(b) by 0 days.

(21) Appl. No.: 14/132,398

(22) Filed: Dec. 18, 2013

(65) Prior Publication Data

US 2014/0165748 A1 Jun. 19, 2014

Related U.S. Application Data (60) Provisional application No. 61/738,639, filed on Dec. 18, 2012.

(51) Int. Cl.
| | |
|---|---|
| *B60K 17/28* | (2006.01) |
| *B60K 25/06* | (2006.01) |
| *F16D 13/22* | (2006.01) |
| *F16D 67/02* | (2006.01) |
| *F16D 67/04* | (2006.01) |
| *F16D 25/0638* | (2006.01) |

(52) U.S. Cl.
CPC .............. *F16D 13/22* (2013.01); *B60K 17/28* (2013.01); *F16D 67/04* (2013.01); *F16D 25/0638* (2013.01)

(58) Field of Classification Search
CPC ........ B60K 17/28; B60K 25/06; H02K 7/112; F16D 13/22; F16D 13/38; F16D 67/02; F16D 67/04; D05B 69/125

USPC ................ 74/11, 15.86; 180/53.1, 53.4, 53.8; 192/18 R, 18 A, 12 C, 70.11, 70.12, 192/70.27, 70.28, 109 R
See application file for complete search history.

(56) References Cited

U.S. PATENT DOCUMENTS

| | | | | |
|---|---|---|---|---|
| 3,041,884 | A | * | 7/1962 | Elfes ............................. 74/15.86 |
| 3,507,372 | A | * | 4/1970 | Gilbertson et al. ......... 192/18 R |
| 3,872,954 | A | | 3/1975 | Nordstrom et al. |
| 3,915,269 | A | * | 10/1975 | Houser ...................... 192/18 A |
| 4,275,607 | A | * | 6/1981 | Snoy .......................... 74/15.63 |
| 4,567,965 | A | | 2/1986 | Woodruff |
| 4,751,989 | A | * | 6/1988 | Shinokawa et al. ......... 192/13 R |
| 5,415,257 | A | * | 5/1995 | Shimamura et al. ............ 192/15 |
| 5,437,355 | A | | 8/1995 | Takagi et al. |
| 5,542,306 | A | | 8/1996 | Fernandez |
| 6,015,032 | A | | 1/2000 | McGourthy, Jr. et al. |
| 6,131,714 | A | | 10/2000 | Bosl et al. |
| 6,142,274 | A | | 11/2000 | Warner |
| 6,305,515 | B1 | * | 10/2001 | Heidenreich et al. ....... 192/18 A |
| 6,497,313 | B1 | | 12/2002 | Blalock |

(Continued)

*Primary Examiner* — Laura Freedman
(74) *Attorney, Agent, or Firm* — Daniel L. Boots; Douglas G. Gallagher; Bingham Greenebaum Doll LLP (57) ABSTRACT

Embodiments of the present disclosure provide an improved clutch-brake for a PTO unit. In accordance with a first embodiment of the present disclosure, a dual direction clutch-brake with a clutch cup is disclosed. When moved in one direction, the clutch cup engages a clutch pack resulting in the input shaft being engaged with the output shaft. When the clutch cap is moved in the opposite direction, the clutch cup engages a breaking member, for example a cover or casing of the PTO unit, which applies a force to the output shaft opposite to the direction of rotation and thereby stops the output shaft from rotating.

39 Claims, 3 Drawing Sheets

(56) References Cited

U.S. PATENT DOCUMENTS

| | | |
|---|---|---|
| 7,070,036 B2 | 7/2006 | Fernandez |
| 7,159,701 B2 | 1/2007 | Graves |
| 7,673,712 B2 * | 3/2010 | Iida et al. .................... 180/53.1 |
| 2004/0211274 A1 * | 10/2004 | Seipold ............................. 74/11 |
| 2013/0228411 A1 * | 9/2013 | Wesley et al. .............. 192/85.61 |
| 2014/0102227 A1 * | 4/2014 | Mayer .............................. 74/11 |

* cited by examiner

DUAL DIRECTION CLUTCH BRAKE

This application claims the benefit of U.S. Provisional Application No. 61/738,639, filed Dec. 18, 2012, the entirety of which is hereby incorporated herein by reference.

FIELD

This disclosure relates to power takeoff devices useful for mounting on vehicle transmissions for performing, directly or indirectly, useful work via its selectively rotatable output shaft. More particularly, this disclosure relates to an improved clutch-brake for stopping rotation of the PTO output shaft when the PTO clutch is disengaged.

BACKGROUND

The use of a power takeoff device (herein referred to by its common abbreviation "PTO") in association with truck or other vehicle (or stationary engine) transmissions is generally known. Generally speaking, such PTO's often include an input gear, an output gear and a mechanism for engaging the input gear with the output gear so as to rotate the output shaft of the PTO to power an auxiliary device to perform useful work when desired. The mechanism also provides a means for disengaging the input gear and the output gear.

In certain conventional designs, the input gear of the PTO is constantly engaged with the appropriate gear in the vehicle's transmission when installed on the vehicle and is, thus, continuously turning whenever that gear in the vehicle's transmission is turning. In order to provide for selective rotation of the output shaft of the PTO (associated with the output gear), a clutch mechanism is frequently provided between this input gear of the PTO and the output gear. When this output shaft is rotated, useful auxiliary work can be performed. For example, the output shaft may be connected to a hydraulic pump that may be used to operate auxiliary equipment, such as garbage compacting bodies, dump bed bodies (a/k/a, "dump trucks"), garbage trucks or trailers, winches, post hole diggers, and the like. Example PTOs are disclosed in U.S. Pat. No. 5,542,306, issued Aug. 6, 1996; U.S. Pat. No. 7,070,036, issued Jul. 4, 2006; and U.S. Pat. No. 7,159,701, issued Jan. 9, 2007.

One type of conventional PTO clutch is operated through an aligned multi-disc stack arrangement located between the shaft of the PTO and the gears of the PTO which engage with the gears of the truck's transmission. When an axial force is applied to the disc stack, the individual discs in the stack are forced together such that the interfacial friction between the discs cause the shaft to be rotationally joined to the rotating gears. Engagement and disengagement of the clutch is frequently effected by an electrically operated solenoid valve arrangement, the switch for which is frequently located (along with an appropriate warning light) in the cab of the truck.

SUMMARY

A problem with many clutch-operated PTO's is that, for one or more reasons, when disengagement of the PTO is attempted or believed to have been accomplished, thereby presumably relieving the inter-disc friction among the discs and stopping shaft rotation, the discs continue to exhibit sufficient frictional connection to create continued, unwanted rotation of the PTO shaft. Such a condition may exist due to, for example, one or more discs being out of tolerance or contamination in the disc stack. Inadvertent shaft rotation, furthermore, may occur not only through continued rotation after the activation of the PTO control from its engaged to its disengaged position, but later, at random times after initial disengagement has been successfully achieved.

Embodiments of the present disclosure provide an improved clutch-brake for a PTO unit. In accordance with a first embodiment of the present disclosure, a dual direction clutch-brake with a clutch cup is disclosed. When moved in one direction, the clutch cup engages a clutch pack resulting in the input shaft being engaged with the output shaft. When the clutch cap is moved in the opposite direction, the clutch cup engages a braking member, for example a cover or casing of the PTO unit, which applies a force to the output shaft opposite to the direction of rotation and thereby stops the output shaft from rotating. Useful characteristics include a clutch-brake with fewer components than other types of PTO output shaft brakes, improved output shaft braking function, simplified manufacturing, lower manufacturing costs, and improved wear characteristics over existing PTO output shaft brakes.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims, but should not be construed to be a limitation unless expressly recited in a particular claim. Each embodiment described herein is not necessarily intended to address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

BRIEF DESCRIPTION OF THE DRAWINGS

Some of the figures shown herein may include dimensions or may have been created from scaled drawings. However, such dimensions, or the relative scaling within a figure, are by way of example, and not to be construed as limiting.

DETAILED DESCRIPTION OF THE ILLUSTRATED EMBODIMENTS

For the purposes of promoting an understanding of the principles of the disclosure, reference will now be made to one or more embodiments illustrated in the drawings and specific language will be used to describe the same. It will nevertheless be understood that no limitation of the scope of the disclosure is thereby intended; any alterations and further modifications of the described or illustrated embodiments, and any further applications of the principles of the disclosure as illustrated herein are contemplated as would normally occur to one skilled in the art to which the disclosure relates. At least one embodiment of the disclosure is shown in great detail, although it will be apparent to those skilled in the relevant art that some features or some combinations of features may not be shown for the sake of clarity.

Any reference to "invention" within this document is a reference to an embodiment of a family of inventions, with no single embodiment including features that are necessarily included in all embodiments, unless otherwise stated. Furthermore, although there may be references to "advantages" provided by some embodiments, other embodiments may not include those same advantages, or may include different advantages. Any advantages described herein are not to be construed as limiting to any of the claims.

Specific quantities (spatial dimensions, temperatures, pressures, times, force, resistance, current, voltage, concentrations, wavelengths, frequencies, heat transfer coefficients, dimensionless parameters, etc.) may be used explicitly or implicitly herein, such specific quantities are presented as examples only and are approximate values unless otherwise indicated. Discussions pertaining to specific compositions of matter, if present, are presented as examples only and do not limit the applicability of other compositions of matter, especially other compositions of matter with similar properties, unless otherwise indicated.

Figure 1:
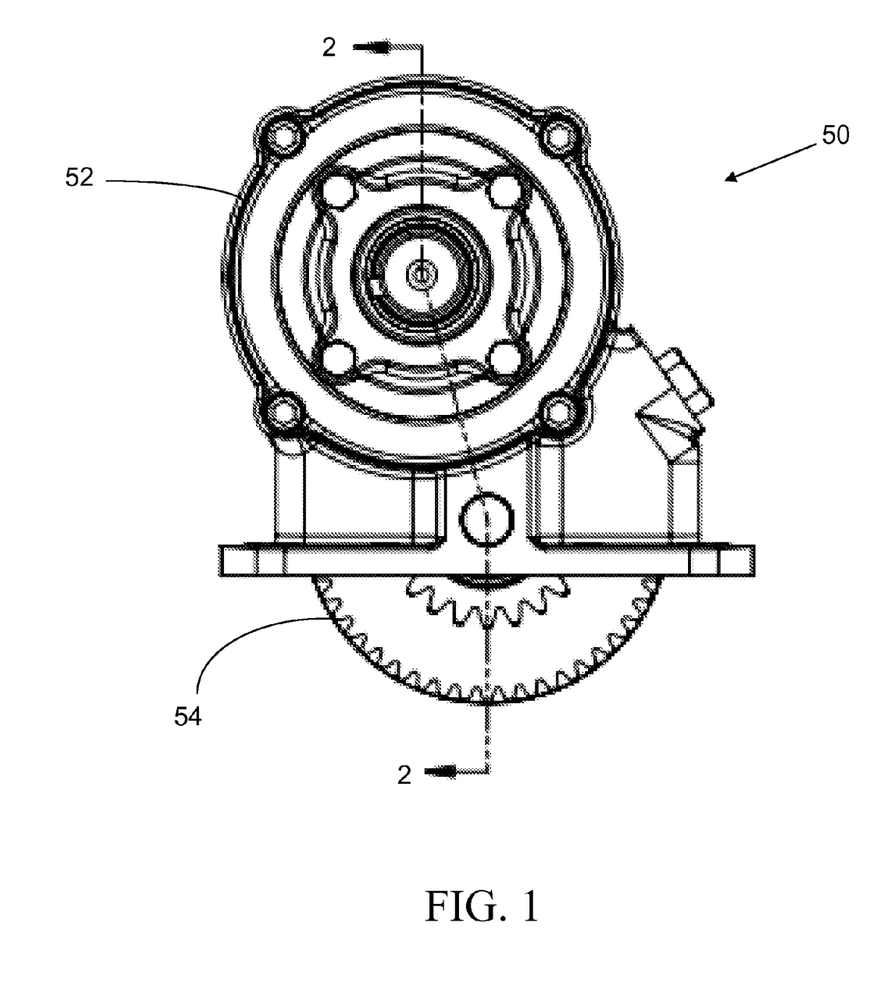
FIG. 1 is a plan view of a power takeoff unit with a clutch-brake according to one embodiment of the present disclosure.
Figure 2:
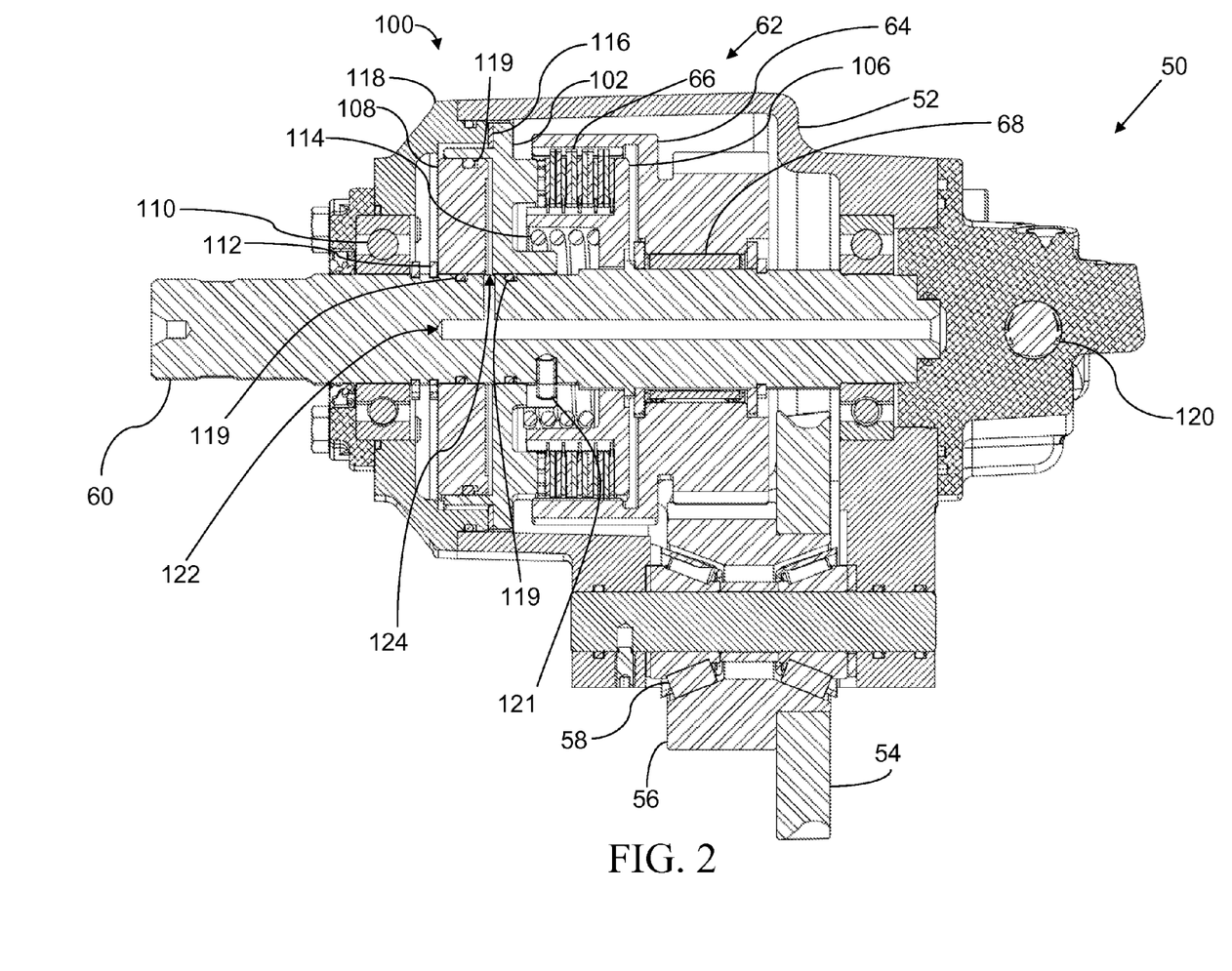
FIG. 2 is a sectional plan view of the power takeoff unit with a clutch-brake depicted in FIG. 1 taken along line 2-2.

Depicted in FIGS. 1 and 2 is a power takeoff unit (PTO) 50 with a clutch-brake 100 according to one embodiment of the present disclosure. PTO 50 includes a housing 52 and a customer/input gear 54. Customer/input gear 54 is coupled to input ratio gear 56. In practice, ratio gear 56 is frequently provided with a specific gear ratio applicable to the needs of the particular vehicle (or stationary apparatus) transmission and the selected torque output desired. Cone bearings 58 are also provided. PTO 50 also includes power takeoff output shaft 60, which is connectable to some other machinery, such as a hydraulic fluid pump (not shown) operated by rotation of shaft 60. Alternatively, shaft 60 may be directly connected to a hydraulic pump or may be connected to any auxiliary equipment operable by the shaft 60.

Associated with the operation of gear 56 and shaft 60, is a connect-disconnect clutch mechanism 62. Such a mechanism includes a clutch cup 102 and a clutch input gear 64. Attached to clutch input gear 64 is a clutch pack 66, which includes a plurality of friction discs. Clutch cup 102 and a clutch hub 106 are attached to shaft 60 so as to correspondingly rotate whenever shaft 60 rotates. Hub 106 is non-movably attached to shaft 60 and clutch cup 102 is slidably attached in the axial direction to shaft 60.

Constantly rotating with the rotating gears of the truck's transmission and, thus, not permanently attached or connected to shaft 60, are customer/input gear 54, input ratio gear 56 and clutch input gear 64. This sub-assembly is allowed to rotate about shaft 60 on bearings 68 whenever the PTO is engaged with the rotating gears of the vehicle's transmission, even when the clutch mechanism has successfully achieved its disengage position so that shaft 60 is not rotating. Clutch input gear 64 is attached to clutch pack 66. Spacer discs in clutch pack 66 rotate whenever clutch input gear 64 rotates. The spacer disks in clutch pack 66 are located so as to be interspersed with the friction disks in clutch patch 66. The friction discs in clutch pack 66, which are attached to clutch hub 106, do not generally rotate when the clutch mechanism is disengaged. As such, rotating spacer discs merely rotate between their respective friction discs until compressed into contact with the friction discs by clutch cup 102 to cause, via friction in the stack, all of the discs in the clutch pack to rotate together. Selective rotation of shaft 60 can thereby be achieved.

Clutch cup 102 moves axially along the output shaft 60. Output shaft 60 and clutch cup 102 are rotationally coupled by pin 121 and rotate together. The axial travel of the clutch piston 108 is restrained by the output bearing 110 and/or snap ring(s) 112.

Figure 3:
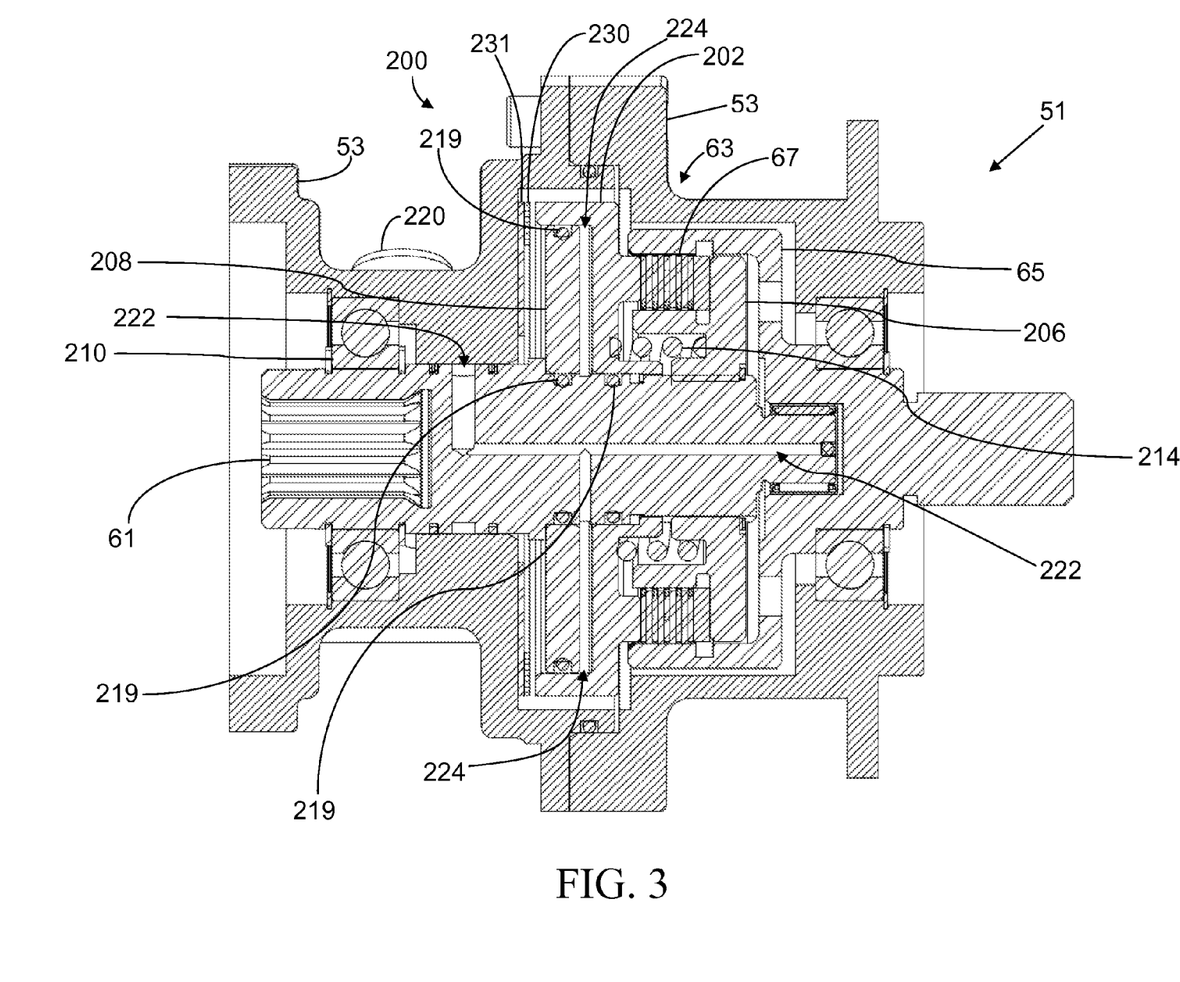
FIG. 3 is a sectional plan view of a power takeoff unit with a clutch-brake according to another embodiment of the present disclosure.

In other embodiments, alternate means of rotationally coupling the output shaft and the clutch cup are used, such by using splines as depicted in FIG. 3. In still further embodiments, restraining the axial travel of the clutch piston is accomplished using alternate means such as, for example, spacers.

Located between piston 108 and clutch cup 102 is piston cavity 124. Piston cavity 124 is in fluidic communication with hydraulic channel 122, which is also in fluidic communication with solenoid 120.

To assemble clutch-brake 100, the clutch piston 108 and clutch cup 102 slip on the output shaft 60 and are sealed with one or more O-rings. Thereafter, the guide pin between output shaft 60 and clutch cup 102 presses into the output shaft 60. The clutch cup 102 has a slot in which the guide pin(s) between output shaft 60 and clutch cup 102 slides or is received. The output cover 118 then slides into the housing 52 and is sealed with one or more O-rings. The friction element(s) 116 may be splined to the clutch cup 102 and may be separated with steel plates (not shown).

In use, an operator commands the solenoid 120 to increase hydraulic fluid pressure within hydraulic channel 122. Since hydraulic channel 122 is in fluidic communication with piston cavity 124, the hydraulic pressure within piston cavity 124 increases. The axial location of clutch piston 108 along output shaft 60 does not change since clutch piston 108 is restrained by the output bearing 110 and/or spacer(s) 112, and the increasing hydraulic pressure within piston cavity 124 forces clutch cup 102 away from clutch piston 108. For example, as the hydraulic pressure within piston cavity 124 increases, clutch cup 102 moves to the right as depicted in FIG. 2 and moves against the clutch pack 66, thereby engaging the clutch input gear 64 with the clutch hub 106 and output shaft 60. O-rings 119 are optionally included to enhance the containment of hydraulic fluid within piston cavity 124.

When solenoid 120 is commanded to decrease and/or remove hydraulic pressure from hydraulic channel 122, the clutch deactivation spring 114 forces the clutch cup 102 away from the clutch pack 66 and disengages clutch pack 66. For example, as the hydraulic pressure within piston cavity 124 decreases, clutch cup 102 moves to the left as the depicted in FIG. 2 to disengage clutch pack 66. As clutch cup 102 moves away from the clutch pack 66 (to the left as depicted in FIG. 2), clutch cup 102 is pressed into a braking surface, which in the illustrated embodiment is a surface of the output cover 118, disengaging the clutch and engaging a braking mechanism. The same member (clutch cup 102) that engages the clutch by pressing on the clutch pack 66 also engages the braking mechanism as it withdraws (or becomes fully withdrawn) from clutch pack 66. As such, the disengagement of the clutch and engagement of the clutch brake occur simultaneously and the possibility of having a failure state with the clutch and the clutch brake engaged at the same time is greatly reduced, if not eliminated.

The friction between the output cover 118 and the clutch cup 102 creates a braking force that is proportional to the force of the deactivation spring 114 multiplied by the coefficient of friction, multiplied by the number of active faces, multiplied by the effective contact face radius. The braking torque is transmitted from the clutch cup 102 to the output shaft 60 through, for example, a guide pin (not depicted). Optionally, friction element(s) 116 may be positioned between output cover 118 and clutch cup 102 and attached to either cover 118 and/or clutch cup 102 to provide additional frictional surfaces for creating the braking force.

Unwanted rotation of shaft 60 is at least inhibited, if not completely eliminated, by clutch-brake 100, which applies braking force to shaft 60 to prevent rotation of shaft 60 when the clutch is disengaged.

In at least one embodiment, when the PTO is turned on the hydraulic pressure is present allowing for engagement of the clutch and simultaneous disengagement of the clutch-brake 100. When the PTO is turned off, hydraulic pressure is not present and clutch-brake 100 is engaged by spring 114 to stop the rotation of the PTO shaft 60. This feature facilitates clutch disengagement and brake engagement in response to hydraulic leaks or other malfunctions resulting in loss of hydraulic pressure.

Depicted in FIG. 3 is a power takeoff unit (PTO) 51 with a clutch-brake 200 according to another embodiment of the present disclosure. PTO 51 is operably connectable to a transmission and engine, and includes a housing 53 and a power takeoff output shaft 61, which is connectable to other machinery, such as hydraulic fluid pumps or electrical generators (not shown) operated by rotation of shaft 61. Alternatively, shaft 61 may be directly connected to a hydraulic pump or may be connected to any auxiliary equipment operable by the shaft 61.

PTO 51 also includes a connect-disconnect clutch mechanism 63, which includes a clutch cup 202 and an input shaft 65. Attached to input shaft 65 is a clutch pack 67, which includes a plurality of friction discs. Clutch cup 202 and a clutch hub 206 are attached to shaft 61 so as to correspondingly rotate whenever shaft 61 rotates. Hub 206 is non-movably attached to shaft 61 and clutch cup 202 is slidably attached in the axial direction to shaft 61. Typically rotating with the rotating gears of the engine's transmission and, thus, not permanently attached or connected to shaft 61, is input shaft 65.

Input shaft 65 is attached to clutch pack 67. Spacer discs in clutch pack 67 rotate whenever input shaft 65 rotates. The spacer disks in clutch pack 67 are located so as to be interspersed with the friction disks in clutch patch 67. The friction discs in clutch pack 67, which are attached to clutch hub 206, are generally intended to not rotate when the clutch mechanism is disengaged. As such, rotating spacer discs are generally intended to merely rotate between their respective friction discs until compressed into contact with the friction discs by clutch cup 202 to cause, via friction in the stack, all of the discs in the clutch pack to rotate together. Selective rotation of shaft 61 can thereby be achieved.

Clutch cup 202 moves axially along the output shaft 61. Output shaft 61 and clutch cup 202 rotate together, and the axial travel of the clutch piston 208 is restrained, directly or indirectly, by the output bearing 210.

Connected to housing 53 is at least one friction element 230, which is aligned with and adapted to engage with a portion of clutch cup 202. An optional mounting member (such as plate 231) may be used to connect friction element 230 to housing 53, and clutch cup 202 may optionally be attached to friction elements that rotate with clutch cup 202.

Located between piston 208 and clutch cup 202 is piston cavity 224. Piston cavity 224 is in fluidic communication with hydraulic channel 222, which is also in fluidic communication with solenoid 220.

In use, an operator commands the solenoid 220 to increase hydraulic fluid pressure within hydraulic channel 222. Since hydraulic channel 222 is in fluidic communication with piston cavity 224, the hydraulic pressure within piston cavity 224 increases. The axial location of clutch piston 208 along output shaft 61 does not change since clutch piston 208 is restrained by the output bearing 210, and the increasing hydraulic pressure within piston cavity 224 forces clutch cup 202 away from clutch piston 208. For example, as the hydraulic pressure within piston cavity 224 increases, clutch cup 202 moves to the right as depicted in FIG. 3 and moves against the clutch pack 67, thereby engaging the input shaft 65 with the clutch hub 206 and output shaft 61. O-rings 219 are optionally included to enhance the containment of hydraulic fluid within piston cavity 224.

When solenoid 220 is commanded to decrease and/or remove hydraulic pressure from hydraulic channel 222, the clutch deactivation spring 214 forces the clutch cup 202 away from the clutch pack 67 and at least partially disengages clutch pack 67. For example, as the hydraulic pressure within piston cavity 224 decreases, clutch cup 202 moves to the left as the depicted in FIG. 3 to disengage clutch pack 67. As clutch cup 202 moves away from the clutch pack 67 (to the left as depicted in FIG. 3), clutch cup 202 is pressed into a braking surface, which in the illustrated embodiment is friction element 230, disengaging the clutch and engaging a braking mechanism. The same member (clutch cup 202) that engages the clutch by pressing on the clutch pack 67 also engages the braking mechanism as it withdraws (or becomes fully withdrawn) from clutch pack 67. As such, the disengagement of the clutch and engagement of the clutch brake occur simultaneously and the possibility of having a failure state with the clutch and the clutch brake engaged at the same time is greatly reduced, if not eliminated.

Unwanted rotation of shaft 61 is at least inhibited, if not completely eliminated, by clutch-brake 200, which applies braking force to shaft 61 to prevent rotation of shaft 61 when the clutch is disengaged.

While illustrated examples, representative embodiments and specific forms of the invention have been illustrated and described in detail in the drawings and foregoing description, the same is to be considered as illustrative and not restrictive or limiting. The description of particular features in one embodiment does not imply that those particular features are necessarily limited to that one embodiment. Features of one embodiment may be used in combination with features of other embodiments as would be understood by one of ordinary skill in the art, whether or not explicitly described as such. Dimensions, whether used explicitly or implicitly, are not intended to be limiting and may be altered as would be understood by one of ordinary skill in the art. Exemplary embodiments have been shown and described, and all changes and modifications that come within the spirit of the invention are desired to be protected.

What is claimed is:

1. A power takeoff, comprising:
an input gear member configured and adapted to connect to and receive mechanical energy from a transmission, the input gear member including at least one rotating gear friction element, the input gear member rotating about an axis when driven by the transmission;
a clutch hub rotatable about the axis, the clutch hub including at least one clutch hub friction element disposed adjacent the at least one rotating gear friction element;
an output shaft rotationally connected to the clutch hub, the output shaft configured and adapted to connect to and supply rotational mechanical energy to machinery, the output shaft rotating about the axis when the clutch hub rotates;

a clutch cup rotationally connected to the output shaft and movable in an axial direction with respect to the output shaft; and a braking member positioned adjacent the clutch cup;

wherein movement of the clutch cup in a first direction
engages the friction elements to rotationally engage the input gear member and the clutch hub, and
moves the clutch cup away from the braking member;

wherein movement of the clutch cup in a second direction
moves the clutch cup toward the braking member and, after sufficient movement, engages the clutch cup with the braking member to retard rotation of the clutch cup and the output shaft, and
disengages the at least one clutch hub friction element and the at least one rotating gear friction element from one another to rotationally disengage the input gear member and the output shaft; and wherein surfaces along which the clutch cup engages the braking member are at a greater radial distance from the axis than the at least one rotating gear friction element.

2. The power takeoff of claim 1, wherein hydraulic pressure moves the clutch cup in the first direction and spring pressure moves the clutch cup in the second direction.

3. The power takeoff of claim 1, wherein:
the input gear member includes a plurality of rotating gear friction elements;
the clutch hub includes a plurality of clutch hub friction elements interspaced with the plurality of rotating gear friction elements; and
one or more surfaces along which the clutch cup engages the braking member are at a greater radial distance from the axis than the plurality of rotating gear friction elements.

4. The power takeoff of claim 1, wherein:
the input gear member includes a plurality of rotating gear friction elements;
the clutch hub includes a plurality of clutch hub friction elements interspaced with the plurality of rotating gear friction elements; and
one or more surfaces along which the clutch cup engages the braking member are at a greater radial distance from the axis than the plurality of clutch hub friction elements.

5. The power takeoff of claim 1, comprising:
at least one brake pad disposed between the clutch cup and the braking member, wherein movement of the clutch cup in the second direction brings the at least one brake pad, the clutch cup, and the braking member into contact with one another to retard rotation of the clutch cup and the output shaft, wherein the contact between the brake pad and the braking member are confined to one or more brake pad surfaces, and wherein the one or more brake pad surfaces are compressed between the clutch cup and the braking member when the clutch cup engages the braking member to retard rotation of the clutch cup and the output shaft.

6. The power takeoff of claim 5, wherein the one or more brake pad surfaces are at a greater radial distance from the axis than the at least one rotating gear friction element.

7. The power takeoff of claim 1, comprising:
at least one brake pad disposed between the clutch cup and the braking member, wherein movement of the clutch cup in the second direction brings the at least one brake pad, the clutch cup, and the braking member into contact with one another to retard rotation of the clutch cup and the output shaft, wherein a surface upon which the at least one brake pad contacts the braking member defines a length in a radial direction of the axis, and wherein the at least one brake pad is supported along its length by the clutch cup.

8. The power takeoff of claim 1, comprising:
at least one brake pad disposed between the clutch cup and the braking member, wherein movement of the clutch cup in the second direction brings the at least one brake pad, the clutch cup, and the braking member into contact with one another to retard rotation of the clutch cup and the output shaft, wherein portions of the brake pad contacting the braking member are directly supported by the clutch cup.

9. The power takeoff of claim 1, comprising:
at least one brake pad disposed between the clutch cup and the braking member, wherein movement of the clutch cup in the second direction brings the at least one brake pad, the clutch cup, and the braking member into contact with one another to retard rotation of the clutch cup and the output shaft, wherein the brake pad does not extend beyond a support of the clutch cup.

10. A method, comprising:
connecting an input gear member to a braking member, wherein the input gear member rotates in relation to the braking member, and wherein the input gear member is adapted to connect to and receive mechanical energy from a transmission to which the braking member attaches;
connecting a clutch hub, a clutch cup, and an output shaft, to the braking member, wherein the clutch hub, clutch cup, and output shaft are each adapted to rotate in relation to the braking member, the output shaft rotating about an axis;
connecting the input gear member to the braking member with the input gear rotating around the axis independently from the output shaft;
connecting the clutch hub and the output shaft, with the clutch hub and the output shaft rotating together around the axis;
connecting the clutch cup and the output shaft, wherein the clutch hub and the output shaft move axially with respect to one another, and wherein the clutch hub and the output shaft rotate around the axis;
positioning the input gear and the clutch hub near one another, wherein movement of the clutch cup in a first axial direction rotationally engages the input gear and the clutch hub, and wherein movement of the clutch cup in a second axial direction rotationally disengages the input gear and the clutch hub; and
positioning the clutch cup near the braking member, wherein movement of the clutch cup in the second axial direction engages the clutch cup and the braking member to rotationally couple the clutch cup, the output shaft, and the braking member.

11. The method of claim 10,
wherein movement of the clutch cup in the first axial direction rotationally engages the input gear and the clutch hub at no more than a first plurality of locations,
wherein movement of the clutch cup in the second axial direction engages the clutch cup and the braking member at no more than a second plurality of locations, and
wherein the first plurality of locations are a greater radial distance from the axis than the second plurality of locations.

12. The method of claim 11, comprising:
positioning at least one brake pad between the clutch cup and the braking member, wherein movement of the clutch cup in the second axial direction brings the clutch cup, the clutch pad, and the braking member into contact with one another, and wherein the contact between the brake pad and the braking member are confined to one or more brake pad surfaces, and wherein the one or more brake pad surfaces are compressed between the clutch cup and the braking member when the clutch cup engages the braking member.

13. The method of claim 10, comprising:
positioning at least one brake pad between the clutch cup and the braking member, wherein movement of the clutch cup in the second axial direction brings the clutch cup, the clutch pad, and the braking member into contact with one another, and wherein the contact between the brake pad and the braking member are confined to one or more brake pad surfaces, and wherein the one or more brake pad surfaces are compressed between the clutch cup and the braking member when the clutch cup engages the braking member.

14. A power takeoff, comprising:
an input gear member configured and adapted to connect to and receive mechanical energy from a transmission, the input gear member including at least one rotating gear friction element, the input gear member rotating about an axis when driven by the transmission;
a clutch hub rotatable about the axis, the clutch hub including at least one clutch hub friction element disposed adjacent the at least one rotating gear friction element;
an output shaft rotationally connected to the clutch hub, the output shaft configured and adapted to connect to and supply rotational mechanical energy to machinery, the output shaft rotating about the axis when the clutch hub rotates;
a clutch cup rotationally connected to the output shaft and movable in an axial direction with respect to the output shaft; and
a braking member positioned adjacent the clutch cup;
wherein movement of the clutch cup in a first direction
engages the friction elements to rotationally engage the input gear member and the clutch hub, and
moves the clutch cup away from the braking member;
wherein movement of the clutch cup in a second direction
moves the clutch cup toward the braking member and, after sufficient movement, engages the clutch cup with the braking member to retard rotation of the clutch cup and the output shaft, and
disengages the at least one clutch hub friction element and the at least one rotating gear friction element from one another to rotationally disengage the input gear member and the output shaft;
wherein one or more surfaces along which the clutch cup engages the braking member are at a greater radial distance from the axis than the at least one clutch hub friction element.

15. The power takeoff of claim 14, wherein surfaces along which the clutch cup engages the braking member are at a greater radial distance from the axis than the at least one rotating gear friction element.

16. The power takeoff of claim 15, wherein hydraulic pressure moves the clutch cup in the first direction and spring pressure moves the clutch cup in the second direction.

17. The power takeoff of claim 14, wherein:
one or more surfaces along which the clutch cup engages the braking member are at a greater radial distance from the axis than the at least one rotating gear friction element.

18. The power takeoff of claim 14, comprising:
at least one brake pad disposed between the clutch cup and the braking member, wherein movement of the clutch cup in the second direction brings the at least one brake pad, the clutch cup, and the braking member into contact with one another to retard rotation of the clutch cup and the output shaft, wherein the contact between the brake pad and the braking member are confined to one or more brake pad surfaces, and wherein the one or more brake pad surfaces are compressed between the clutch cup and the braking member when the clutch cup engages the braking member to retard rotation of the clutch cup and the output shaft.

19. The power takeoff of claim 18, wherein the one or more brake pad surfaces are at a greater radial distance from the axis than the at least one rotating gear friction element.

20. The power takeoff of claim 14, comprising:
at least one brake pad disposed between the clutch cup and the braking member, wherein movement of the clutch cup in the second direction brings the at least one brake pad, the clutch cup, and the braking member into contact with one another to retard rotation of the clutch cup and the output shaft, wherein a surface upon which the at least one brake pad contacts the braking member defines a length in a radial direction of the axis, and wherein the at least one brake pad is supported along its length by the clutch cup.

21. The power takeoff of claim 14, comprising:
at least one brake pad disposed between the clutch cup and the braking member, wherein movement of the clutch cup in the second direction brings the at least one brake pad, the clutch cup, and the braking member into contact with one another to retard rotation of the clutch cup and the output shaft, wherein portions of the brake pad contacting the braking member are directly supported by the clutch cup.

22. The power takeoff of claim 14, comprising:
at least one brake pad disposed between the clutch cup and the braking member, wherein movement of the clutch cup in the second direction brings the at least one brake pad, the clutch cup, and the braking member into contact with one another to retard rotation of the clutch cup and the output shaft, wherein the brake pad does not extend beyond a support of the clutch cup.

23. A power takeoff, comprising:
an input gear member configured and adapted to connect to and receive mechanical energy from a transmission, the input gear member including at least one rotating gear friction element, the input gear member rotating about an axis when driven by the transmission;
a clutch hub rotatable about the axis, the clutch hub including at least one clutch hub friction element disposed adjacent the at least one rotating gear friction element;
an output shaft rotationally connected to the clutch hub, the output shaft configured and adapted to connect to and supply rotational mechanical energy to machinery, the output shaft rotating about the axis when the clutch hub rotates;
a clutch cup rotationally connected to the output shaft and movable in an axial direction with respect to the output shaft;
a braking member positioned adjacent the clutch cup; and at least one brake pad disposed between the clutch cup and the braking member;

wherein movement of the clutch cup in a first direction engages the friction elements to rotationally engage the input gear member and the clutch hub, and moves the clutch cup away from the braking member;

wherein movement of the clutch cup in a second direction moves the clutch cup toward the braking member and, after sufficient movement, engages the clutch cup with the braking member to retard rotation of the clutch cup and the output shaft, and disengages the at least one clutch hub friction element and the at least one rotating gear friction element from one another to rotationally disengage the input gear member and the output shaft;

wherein movement of the clutch cup in the second direction brings the at least one brake pad, the clutch cup, and the braking member into contact with one another to retard rotation of the clutch cup and the output shaft;

wherein the contact between the brake pad and the braking member are confined to one or more brake pad surfaces;

wherein the one or more brake pad surfaces are compressed between the clutch cup and the braking member when the clutch cup engages the braking member to retard rotation of the clutch cup and the output shaft; and wherein the one or more brake pad surfaces are at a greater radial distance from the axis than the at least one rotating gear friction element.

24. The power takeoff of claim 23, wherein surfaces along which the clutch cup engages the braking member are at a greater radial distance from the axis than the at least one rotating gear friction element.

25. The power takeoff of claim 24, wherein hydraulic pressure moves the clutch cup in the first direction and spring pressure moves the clutch cup in the second direction.

26. The power takeoff of claim 23, wherein:
the input gear member includes a plurality of rotating gear friction elements;
the clutch hub includes a plurality of clutch hub friction elements interspaced with the plurality of rotating gear friction elements; and
one or more surfaces along which the clutch cup engages the braking member are at a greater radial distance from the axis than the plurality of rotating gear friction elements.

27. The power takeoff of claim 23, wherein:
the input gear member includes a plurality of rotating gear friction elements;
the clutch hub includes a plurality of clutch hub friction elements interspaced with the plurality of rotating gear friction elements; and
one or more surfaces along which the clutch cup engages the braking member are at a greater radial distance from the axis than the plurality of clutch hub friction elements.

28. The power takeoff of claim 23, wherein a surface upon which the at least one brake pad contacts the braking member defines a length in a radial direction of the axis, and wherein the at least one brake pad is supported along its length by the clutch cup.

29. The power takeoff of claim 23, wherein portions of the brake pad contacting the braking member are directly supported by the clutch cup.

30. The power takeoff of claim 23, wherein the brake pad does not extend beyond a support of the clutch cup.

31. A power takeoff, comprising:
an input gear member configured and adapted to connect to and receive mechanical energy from a transmission, the input gear member including at least one rotating gear friction element, the input gear member rotating about an axis when driven by the transmission;
a clutch hub rotatable about the axis, the clutch hub including at least one clutch hub friction element disposed adjacent the at least one rotating gear friction element;
an output shaft rotationally connected to the clutch hub, the output shaft configured and adapted to connect to and supply rotational mechanical energy to machinery, the output shaft rotating about the axis when the clutch hub rotates;
a clutch cup rotationally connected to the output shaft and movable in an axial direction with respect to the output shaft;
a braking member positioned adjacent the clutch cup; and
at least one brake pad disposed between the clutch cup and the braking member;
wherein the brake pad does not extend beyond a support of the clutch cup;
wherein movement of the clutch cup in a first direction engages the friction elements to rotationally engage the input gear member and the clutch hub, and moves the clutch cup away from the braking member; and
wherein movement of the clutch cup in a second direction brings the at least one brake pad, the clutch cup, and the braking member into contact with one another to retard rotation of the clutch cup and the output shaft, moves the clutch cup toward the braking member and, after sufficient movement, engages the clutch cup with the braking member to retard rotation of the clutch cup and the output shaft, and
disengages the at least one clutch hub friction element and the at least one rotating gear friction element from one another to rotationally disengage the input gear member and the output shaft.

32. The power takeoff of claim 31, wherein surfaces along which the clutch cup engages the braking member are at a greater radial distance from the axis than the at least one rotating gear friction element.

33. The power takeoff of claim 32, wherein hydraulic pressure moves the clutch cup in the first direction and spring pressure moves the clutch cup in the second direction.

34. The power takeoff of claim 31, wherein:
the input gear member includes a plurality of rotating gear friction elements;
the clutch hub includes a plurality of clutch hub friction elements interspaced with the plurality of rotating gear friction elements; and
one or more surfaces along which the clutch cup engages the braking member are at a greater radial distance from the axis than the plurality of rotating gear friction elements.

35. The power takeoff of claim 31, wherein:
the input gear member includes a plurality of rotating gear friction elements;
the clutch hub includes a plurality of clutch hub friction elements interspaced with the plurality of rotating gear friction elements; and
one or more surfaces along which the clutch cup engages the braking member are at a greater radial distance from the axis than the plurality of clutch hub friction elements.

36. The power takeoff of claim 31, wherein the contact between the brake pad and the braking member are confined to one or more brake pad surfaces, and wherein the one or more brake pad surfaces are compressed between the clutch cup and the braking member when the clutch cup engages the braking member to retard rotation of the clutch cup and the output shaft.

37. The power takeoff of claim 36, wherein the one or more brake pad surfaces are at a greater radial distance from the axis than the at least one rotating gear friction element.

38. The power takeoff of claim 31, wherein a surface upon which the at least one brake pad contacts the braking member defines a length in a radial direction of the axis, and wherein the at least one brake pad is supported along its length by the clutch cup.

39. The power takeoff of claim 31, wherein portions of the brake pad contacting the braking member are directly supported by the clutch cup.

\* \* \* \* \*